(12) United States Patent
Lo et al.

(10) Patent No.: US 6,844,281 B2
(45) Date of Patent: Jan. 18, 2005

(54) REINFORCEMENT PREFORM FOR METAL MATRIX COMPOSITES

(75) Inventors: Jason S. H. Lo, Nepean (CA); Areekattuthazhayil K. Kuriakose, Nepean (CA); Raul Santos, Ottawa (CA)

(73) Assignee: Her Majesty the Queen in right of Canada, as represented by the Minister of Natural Resources, Ottawa (CA)

( * ) Notice: Subject to any disclaimer, the term of this patent is extended or adjusted under 35 U.S.C. 154(b) by 58 days.

(21) Appl. No.: 10/295,902

(22) Filed: Nov. 18, 2002

(65) Prior Publication Data

US 2003/0069123 A1 Apr. 10, 2003

Related U.S. Application Data

(63) Continuation-in-part of application No. 09/809,161, filed on Mar. 16, 2001, now Pat. No. 6,506,502, and a continuation-in-part of application No. 09/357,161, filed on Jul. 19, 1999, now Pat. No. 6,247,519.

(51) Int. Cl.$^7$ ...................... C04B 35/553; C04B 35/56; C04B 35/58
(52) U.S. Cl. .............................. 501/88; 501/89; 501/90; 501/91; 501/92; 501/93; 501/96.1; 501/96.4; 501/99; 501/101; 501/108; 75/236; 75/238; 75/241
(58) Field of Search .............................. 501/88, 89, 90, 501/91, 92, 93, 96.1, 96.4, 99, 101, 108, 95.1, 95.2, 95.3, 97.1; 75/236, 238, 241

(56) References Cited

U.S. PATENT DOCUMENTS

| | | | |
|---|---|---|---|
| 4,657,876 A | * | 4/1987 | Hillig ........................... 501/87 |
| 5,043,305 A | | 8/1991 | Tanaka et al. |
| 6,193,915 B1 | | 2/2001 | Lo et al. |

FOREIGN PATENT DOCUMENTS

| JP | 06247780 | * | 9/1994 |
|---|---|---|---|
| JP | 07 033526 | | 3/1995 |

* cited by examiner

Primary Examiner—Paul Marcantoni
(74) Attorney, Agent, or Firm—Shapiro Cohen

(57) ABSTRACT

A preform for use in a metal matrix composite, particularly for a magnesium metal composite. In the preform the reinforcing material typically is silicon carbide, boron nitride, titanium nitride, carbon or graphite. The binder used in the preform is sintered magnesium fluoride, which avoids the known problems which result from the high reactivity of molten magnesium metal with other binders, such as silica and alumina, which results in the formation of magnesium oxide in the reinforced composite. The presence of magnesium oxide crystals in the metal matrix adversely affects the properties of the composite. The preform generally has a void volume of from about 50% to about 95%.

5 Claims, No Drawings

REINFORCEMENT PREFORM FOR METAL MATRIX COMPOSITES

RELATED APPLICATIONS

This application is a continuation-in-part of application Ser. No. 09/357,161, filed Jul. 19, 1999, and issued as U.S. Pat. No. 6,247,519 and of application Ser. No. 09/809,161 filed Mar. 16, 2001 now U.S. Pat. No. 6,506,502.

FIELD OF THE INVENTION

This invention is concerned with reinforcing preforms used in the production of metal matrix composites. More particularly, this invention is concerned with preforms for use in making magnesium metal matrix composites.

DESCRIPTION OF THE PRIOR ART

It is well known that many metals, especially the so-called light metals, which generally includes aluminum, magnesium, and alloys of each of these metals, whilst having many of the advantages of a metal, such as the ability to be welded, and in particular the advantage of low weight, also have the disadvantage that their strength properties are relatively low. In the past, this has limited the usefulness of these metals. One method that has been proposed to overcome this difficulty is to use the metals in the form of a composite, so that the composite more than compensates for the lack of mechanical, physical and other properties. Typical materials used as the reinforcement in such a composite include carbon, graphite, silicon carbide, titanium diboride, titanium nitride, boron carbide and boron nitride; they can be the form of a particulate, fibre, tow, whisker or mixtures of these forms. These materials all survive essentially unchanged in the composite. Techniques for making metal matrix composites from both aluminum and magnesium are well known, and have been described for example in U.S. Pat. No. 4,279,289; U.S. Pat. No. 4,715,442; U.S. Pat. No. 4,995,444 and U.S. Pat. No. 5,791,397.

These methods broadly involve a two step technique. In the first step, a preform is made from the reinforcing material which is held together with a binder material which acts essentially as a glue. The commonly used binders are fired ceramic materials, of which silica is perhaps the commonest. The reinforcing material preform is generally invested with the silica binder system, and then fired both to burn off organic materials used to aid investment with the binder, and to convert the binder into silica. In the second step, the preform is invested with the molten metal to provide a composite material, typically by using the so-called squeeze casting technique, in which the molten metal is forced under high pressure into the preform contained in a mould. It is thus apparent that the final composite body comprises essentially only three components: the reinforcement material, the binder which holds the reinforcement material together as a preform of the desired shape, and the investment metal. The presence of each of these can be demonstrated by suitable examination techniques, such as electron micrography.

In this procedure, one important feature of the second step is the relative amounts of investment metal and reinforcement preform, including the binder, in the composite product. The space occupied by the reinforcement preform is generally expressed as a volume fraction of the finished composite: for example, in the finished composite there could be 75% by volume of metal, and 25% by volume of reinforcement preform. The volume actually occupied by the preform can be far lower than this, as techniques for fabricating composites containing as little as 5% reinforcement have been described (see Lo and Santos, U.S. Pat. No. 6,193,915 issued Feb. 17, 2001). If the reinforcement is distributed more or less evenly in the composite material it then follows that the volume fraction of invested metal is more or less the same as the void volume in the preform: for investment to be possible most of the volume occupied by the preform has to be empty space. It is known to fabricate composites using whiskers or fibres of the reinforcement material in which the preform volume fraction is as low as 5%, which means that in the preform the void volume can be as high as 95%. The upper limit on the volume fraction occupied by the preform in the composite product is determined by the properties required in the final composite product; generally the limit is about 50%. The upper limit on the void volume in the preform is the ability to fabricate a preform which is mechanically stable enough to withstand the stresses imposed by the investment process.

It is thus apparent that a reinforcement preform is quite different to a ceramic in that it will have a void volume that is at least about 50% and commonly is far higher than this, up to about 95%. This level of void volume, which is not generally found in ceramics, is essential because without it investment with a molten metal is not possible. Additionally, again unlike a ceramic material, at this level of void volume a reinforcement preform is fragile and needs to be handled carefully.

Although these methods are more or less successful with aluminum, and aluminum alloys, they are less successful when used to fabricate composites in which the invested metal is magnesium, or a magnesium containing alloy in which magnesium is not necessarily the major metal, such as magnesium-containing alloys of aluminium. The difficulties arise from the fact that molten magnesium is a very reactive material, which has two consequences.

The first is that the use of silica, which is the commonest preform binder, becomes questionable, because reaction (1) occurs:

$$2Mg + SiO_2 \rightarrow Si + 2MgO \qquad (1)$$

The metallic silicon that is formed will dissolve into the magnesium to form a silicon-magnesium phase which generally will not have a deleterious effect on the properties of the magnesium metal, and thus of the resulting composite. The magnesium oxide is formed as a more or less crystalline solid, which does not dissolve in the molten investment metal. The presence of these crystals of magnesium oxide has been shown to have a deleterious effect on the overall properties of the composite when a sufficient amount of magnesium oxide is present. It can therefore be seen that this reaction places significant restrictions on the preform binder that can be used if the creation of magnesium oxide is to be avoided.

The second is that similar reactions will also happen with several of the other materials commonly used as either binders or reinforcement; all of the following reactions are known to occur:

$$3Mg + Al_2O_3 \rightarrow 2Al + 3MgO \qquad (2)$$

$$2Mg + TiO_2 \rightarrow Ti + 2MgO \qquad (3)$$

$$Mg_3(PO_4)_2 + 5Mg \rightarrow 8MgO + 2P \qquad (4)$$

In reactions (2) and (3) the aluminum and titanium alloy with the magnesium, and in reaction (4) the phosphorus vaporizes. In these reactions although the silicon, aluminum and titanium have minimal, if any, effect on the properties of the investment metal in the resulting composite, this cannot be said for the magnesium oxide crystals that are produced in all four cases. The presence of brittle and weak magnesium oxide crystals in the metal makes the composite prone to crack formation. It can also be seen that these reactions place significant limitations on the materials which can be used either as the binder for a reinforcement preform or as a reinforcement material when the investment metal contains magnesium if the creation of magnesium oxide is to be avoided.

SUMMARY OF THE INVENTION

There is therefore a need for a binder system that can be used to create preforms for use in the manufacture of composites, in which the metal used is magnesium, or an alloy containing magnesium. Further, such a binder system should desirably be equally useful with both particulate and fibrous reinforcing materials, and should be potentially useful with other, less reactive, metals.

This invention seeks to provide a reinforcement preform for a magnesium metal matrix composite which involves the use of a preform binder system which is unreactive with molten magnesium, does not cause the creation of undesirable solid materials in the magnesium composite, and which can be used with the reinforcing materials commonly used with magnesium which also do not involve the formation of any magnesium oxide during the investment process. In addition, this invention also seeks to provide a reinforcement preform useful in composites in which the metal is not magnesium, such as aluminium and aluminium alloy composites.

DETAILED DESCRIPTION OF THE INVENTION

Thus this invention seeks to provide a reinforcement preform for a metal matrix composite having a void volume of at least about 50%, wherein the preform is bonded with sintered magnesium fluoride.

The sintered magnesium fluoride bonded preform is conveniently prepared by a process comprising:

(a) forming a slurry of the reinforcing material with magnesium fluoride in an aqueous solution of magnesium chloride;

(b) pouring the slurry into a mould;

(c) allowing the slurry in the mould to set, to provide a shaped green preform;

(d) drying the green preform to remove water; and (e) firing the green preform at a temperature of about 1,100° C. to provide a finished preform, in which the binder is sintered magnesium fluoride.

For infiltration with a metal, such as magnesium, the preform is placed in a second mould and infiltrated in the second mould with molten metal to provide a metal composite, for example by the squeeze casting method.

Typically, the metal in the reinforced composite is a light metal, such as aluminum, magnesium, or alloys thereof.

Preferably, the reinforcement used in the preform is chosen from at least one member of the group consisting of carbon, graphite, boron carbide, silicon carbide, titanium diboride, boron nitride, and mixtures thereof.

Preferably, the reinforcement comprises a particulate reinforcement. Alternatively, the reinforcement comprises a fiber, tow or whisker material. In a further alternative, the reinforcement comprises a mixture of particulate and/or fibre and/or tow and/or whisker reinforcement, so that a hybrid composite is obtained including more than one reinforcement in more than one physical form.

In the process to make the reinforcement preform a slurry is first prepared of the reinforcing material, for example of particulate silicon carbide, mixed with magnesium fluoride in a solution of magnesium chloride. The slurry is poured into a porous mould, for example to provide a disc shaped preform, and allowed to set. During the setting process, hydrated magnesium chloride, $MgCl_2.6H_2O$, is formed, which serves as a low temperature binder, to hold the green preform together. The cast disc is then air dried, typically by gentle heating in an oven at about 45° C. The use of a porous mould ensures that the preform dries evenly, and without cracking or other deformation, during the drying step. The hydrated magnesium chloride imparts sufficient green strength to the preform to enable it to be handled with reasonable care.

The dried green preform is then fired at about 1,100° C. In the firing step, the magnesium chloride decomposes, and is essentially driven off; at the same time the magnesium fluoride sinters, bonding the silicon carbide powder together to form a porous body. The resulting fired disc is also quite strong enough to be handled.

In order to make a metal composite, for example a magnesium or magnesium alloy composite, the shaped preform is placed in a second mould, and then infiltrated with molten magnesium, or a molten magnesium alloy. Typical alloying elements for magnesium include aluminum, beryllium, calcium, copper, lithium, manganese, metals from the rare earths group, silicon, silver, thorium, tin, zinc, zirconium, and yttrium, and combinations of metals. Similarly, aluminum or an aluminum alloy can be used as the infiltrated metal. Typical alloying elements for aluminum include magnesium, beryllium, calcium, copper, lithium, manganese, metals from the rare earths group, silicon, silver, thorium, tin, zinc, zirconium, and yttrium, and combinations of metals.

It is preferred that the infiltration of the preform to provide the desired metal composite is carried out by the squeeze casting method.

It can thus be seen that the binder of this invention avoids the difficulties attendant by providing a binder for a reinforcement preform which will not react with molten magnesium, or with a molten alloy containing magnesium. It then follows that by choosing a reinforcement material which also will not react with molten magnesium or with a molten alloy containing magnesium, introduction of crystalline solids such as magnesium oxide into the metal phase of the composite material is completely avoided. Examination of magnesium composites made by this process, in which the reinforcement is silicon carbide, shows that the majority of the magnesium fluoride remains bonded to the silicon carbide.

Although the magnesium fluoride binder used in the process of this invention is uniquely suitable for use in preforms which are later infiltrated with molten magnesium or a molten alloy containing magnesium since it will not react with them, it is not so limited. It is also suitable for use with other metals where the reaction problem does not arise, in particular aluminum and aluminum alloys.

What is claimed is:

1. A reinforcement preform for a metal matrix composite having a void volume of at least about 50%, wherein the preform is bonded with sintered magnesium fluoride.

2. A reinforcement preform according to claim 1 wherein the reinforcement material used in the preform is selected from at least one member of the group consisting of carbon, graphite, silicon carbide, titanium diboride, titanium nitride, boron carbide, boron nitride and mixtures thereof.

3. A reinforcement preform according to claim 1 wherein the reinforcement material is in a physical form selected from at least one of the group consisting of particulate, fibre, tow, whisker and mixtures thereof.

4. A reinforcement preform according to claim 1 wherein the preform comprises a sintered magnesium fluoride bonded particulate reinforcement.

5. A reinforcement preform according to claim 1 wherein the preform has a void volume of from about 50% to about 95%.

* * * * *